Sept. 20, 1955　　　R. F. MINER　　　2,718,086
CASTING BAIT
Filed May 15, 1952　　　　　2 Sheets-Sheet 1
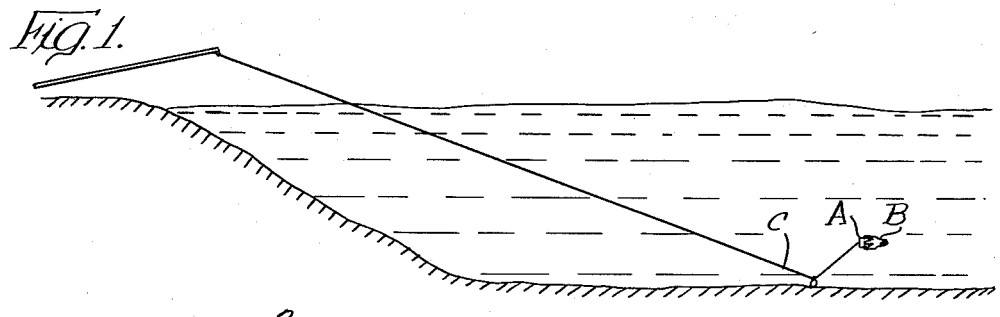
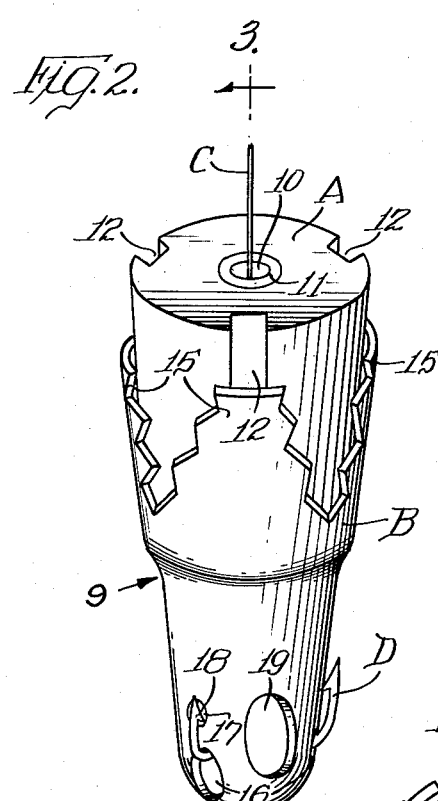
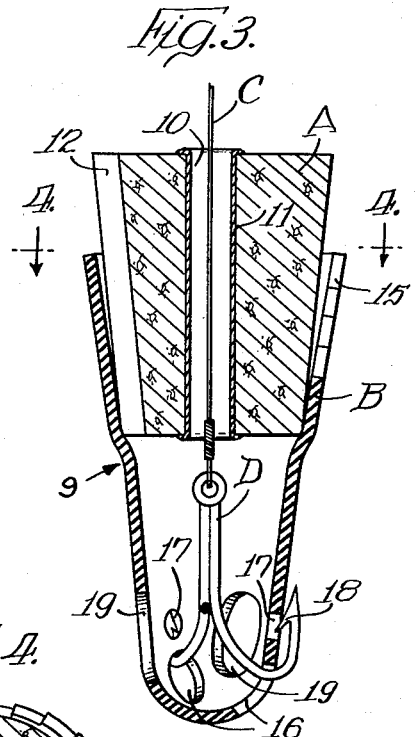
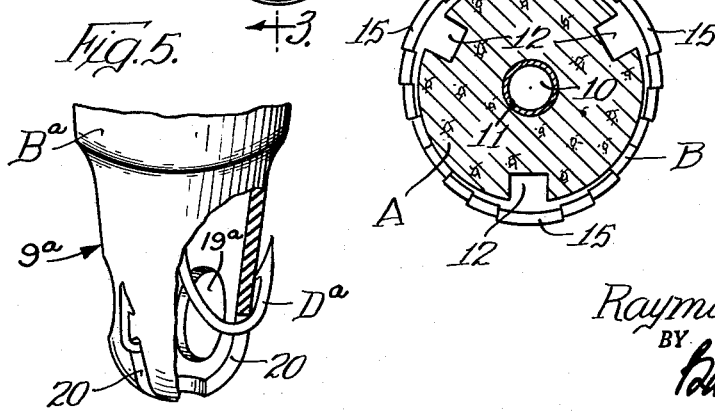
INVENTOR.
Raymond F. Miner
BY
Banning & Banning
Attys.

Sept. 20, 1955  R. F. MINER  2,718,086
CASTING BAIT
Filed May 15, 1952  2 Sheets-Sheet 2
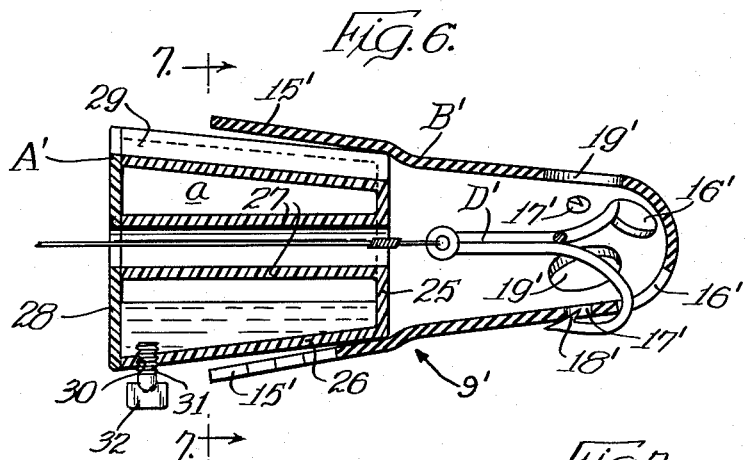
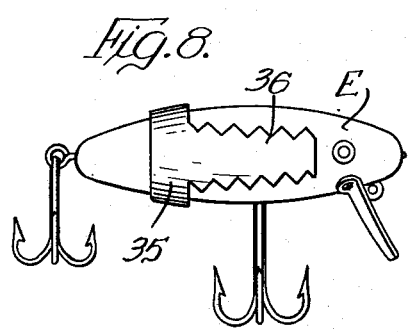
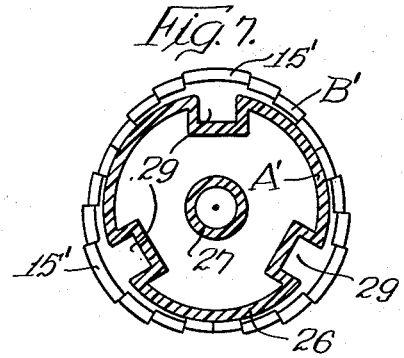
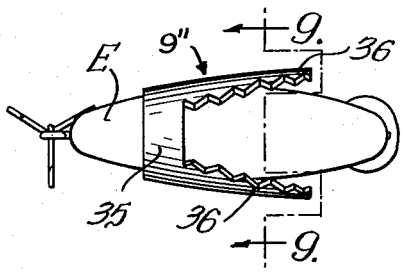
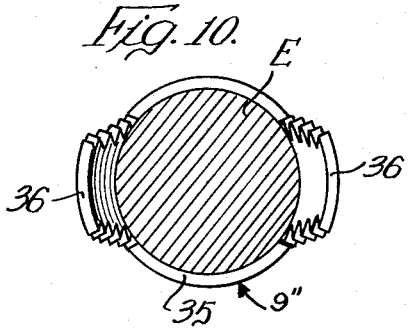
INVENTOR.
Raymond F. Miner
BY
Attys.

United States Patent Office 2,718,086
Patented Sept. 20, 1955

2,718,086

CASTING BAIT

Raymond F. Miner, West Branch, Iowa

Application May 15, 1952, Serial No. 287,935

9 Claims. (Cl. 43—42.06)

This invention relates to a casting type of bait which has special attraction for catfish, although it may be used with great success in the catching of other kinds of fish.

The object of this invention is to provide a lure which is simple to produce, relatively inexpensive, and highly effective for its intended purposes. In addition the bait is one which can readily be adapted for use near the surface, or near the bottom. The movement of the bait, as it is retrieved, is also controllable within wide limits and this is another feature of the present invention.

This invention may be embodied in various forms and be modified in various ways some of which are suggested in the accompanying drawing wherein—

Figure 1 is a semi-diagrammatic view showing the bait as it appears when retrieved and held close to the bottom by a sinker which is attached to the leader at its forward end;

Fig. 2 is a view in perspective of the bait in one form;

Fig. 3 is a longitudinal sectional view of the bait taken on line 3—3 of Fig. 2;

Fig. 4 is a transverse sectional view, taken on line 4—4 of Fig. 3;

Fig. 5 is a fragmentary perspective view showing a modification in the slots in the partial closure at the rear end of the band that is applied to the bait body;

Fig. 6 which is a view similar to Fig. 3 shows the bait body modified to the extent of being chambered with a filler opening provided for admitting water thereinto;

Fig. 7 is a transverse sectional view taken on line 7—7 of Fig. 6;

Fig. 8 is a side elevation of a conventional plug casting bait equipped with the resilient wing feature of this invention; and Fig. 9 is a top plan view thereof; and Fig. 10 is a transverse section taken on line 10—10 of Fig. 9.

The bait as shown in Figs. 1–4 comprises a buoyant body A around which is closely fitted an elongated resilient member 9 having a band portion B and the member is extended rearwardly beyond the trailing end of the body to form a partial closure at this point. As shown, the body A is of truncated conical form tapering inwardly slightly toward its rear end, and is provided therethrough with an axial opening 10 wherein may be fitted a sleeve 11 whose opposite ends are upset to engage the proximate ends of the body, thereby locking the sleeve in place. A plurality of longitudinally extending channels 12 are also formed in the outer periphery of the body.

The member 9 is desirably formed of resilient material, such as rubber, and it may be necessary to stretch its front end portion slightly in order to fit it over the rear end portion of the body A. The member 9 is formed with a plurality of incisions extending longitudinally inwardly from its front edge. These incisions may be wide at the front and narrow at the rear to define between them wings 15 that are transversely bowed outwardly and are tapered inwardly toward their front ends. The wings along their opposite edges are desirably toothed or stepped, as shown, and each is disposed opposite one of the channels 12. The purpose of these wings is to activate the bait as it is retrieved, thereby to impart a desirable erratic movement thereto. This end is attained due, in part, to the resiliency of the wings which are free to flex outwardly and thereby offer an increased and uncertain resistance to the bait movement through the water.

Through the axial opening 10 is extended a leader (or line) C which at its rear end is joined to the eye of a hook D which may be of the treble-type, as shown. The free end portions of the shanks comprised in this hook are curved outwardly and upwardly and pass out of the partial closure at the rear end of the member 9 through narrow holes 16 which are provided therein. A further small hole 17 is located just forwardly of each hole 16 in a position to receive one barb 18 of the hook which is thereby concealed and protected. Other larger holes 19 are provided intermediately of the small holes 17 and forwardly thereof to facilitate outflow of water that is trapped within the partial closure rearwardly of the bait body A. Desirably the member 9 is rotatively positioned so that its large holes 19 are disposed in line with the channels 12, if the bait is to be used for catching certain fish, such as catfish. The resilient member 9, it will be noted, constitutes the sole support for the hook, and provides therefor a mounting that is floating and also separable under certain conditions, as when a fish strikes hard and fights vigorously. In such circumstances, the bait body is freed from the hook to run up the leader or line but without enabling the fish to work loose from the hook.

In place of using separated holes 16 and 17 for each shank of the hook, a single continuous slot 20 may be used (see Fig. 5). This is a suggestive modification for the member 9 (designated in Fig. 5 as 9a), the bait therein shown otherwise is the same as the bait already described in conjunction with Figs. 1–4 and similar parts are given the same reference characters with the additional character "a".

The body A may be of lightweight material such as cork. However, it may be produced from other non-buoyant materials which are formed to provide a chamber interiorly of the body whereby to produce a condition of buoyancy. Such a construction is shown in Figs. 6 and 7. As many parts of the bait shown in Figs. 6 and 7 are similar to those described in conjunction with Figs. 1–4, a number of the same reference numerals, but primed, are applied to similar parts. In Figs. 6 and 7 the body A' is produced from a material, such as plastic, with one end wall 25, an outer peripheral wall 26, and an inner peripheral wall 27 defining between them an annular chamber $a$. A resilient member 9' having an integral band portion B' is slipped over the body and frictionally held in place thereon as shown. The inner wall 27 is, in effect, an open-ended axial tube extending through the bait body. The opposite body end is covered by a closure disc 28 which is secured and sealed in place. Channels 29 are extended longitudinally of the body, exteriorly thereof (see Fig. 7), one opposite each of the wings 15.

A tapped opening 30 (Fig. 6) is also provided in the body wall 26, preferably near its front end, to receive the threaded shank 31 of a plug having a head 32 that is narrowed after the manner of a fin. Such a plug is desirably made of lead or other material having a sufficient weight to stabilize the bait and prevent its rotation when being retrieved through the water. The plug with its fin-head may be adjusted to any one of a large number of rotative positions and serves to control to some extent the nature of the bait movement while retrieving proceeds. While the air chamber $a$ within the body A' is capable of rendering it highly buoyant, this property may be modified widely by admitting water into the chamber to whatever extent is desired. If the bait is to be used close to the bottom, then obviously enough water should be contained within the chamber to assure its operation in relatively deep water.

In use, as the bait thus far described is drawn axially through the water, the forward end portions of the channels 12 or 29 will act as scoops to receive water for longitudinal movement therethrough. The rear end portion of the resilient members 9 or 9' are then free to swell outwardly to a slight extent depending upon the flexibility of the material composing its walls. Escape of the water thus trapped in the rear end portion of the member takes place through the large holes 19 (or 19', or 19a) and the other holes through which the curved ends of the hooks are extended. The barb of each hook is sufficiently covered by the expanded walls of the members 9 and 9' so that its presence is not readily detected; the walls of the members, however, are free to flex inwardly when a fish strikes so that the barb immediately becomes effective to engage the mouth of the fish. The action of the water in moving longitudinally through the channels 12 or 29 is supplemented by the axial passageway 11 of the bait of Figs. 1–6 or by the passageway defined by the tube 27 in Figs. 6 and 7, each of which functions similarly to the channels, so as to reduce the resistance of the bait to its axial movement through the water. A further modification is shown in Figs. 8–10 wherein certain features of the invention are applied to an ordinary plug bait.

Referring now to Figs. 8–10 I have shown the resilient member 9" modified to omit any partial closure at its rear end. When the band portion 35 of the member is fitted tightly around the body of a plug bait E, its two wings 36 are extended forwardly to lie alongside the proximate sides of the bait body in slightly divergent relation thereto. The wings are bowed transversely and tapered inwardly toward their free forward ends, and the sides of the wings are desirably toothed or serrated to increase their resistance to forward movement through the water. When applied to a plug bait, the wings are disposed on opposite sides thereof so as to remain free and clear of any gang hook depending from its underside. When drawn through the water, the wings on their inner faces are subjected to a pressure tending to expand them outwardly, and in this movement are flexed through curves of varying amplitude. As a result, the normal movement of the bait is modified and made more erratic because of the uncertain flexure of the side wings which impose a varying resistance to the bait movement through the water.

My invention in the form of Figs. 8–10 comprises simply a one-piece attachment that may be readily fitted to the body of a plug bait E. In this operation the resilient member 9" is stretched somewhat so that the resulting tension which it maintains on the body is sufficient to hold the member fixedly in place. The wings require no separate handling since they are formed as part of the member to occupy operative positions therewith, and are free to flex outwardly in response to pressure of the water which is entrapped between the sides of the bait and the wings. The wings in each of the constructions shown are widened toward their bases where they are joined to the resilient member, thereby to be strengthened sufficiently to spring inwardly to a normal position of rest that is relatively close to the body of the bait.

I claim:

1. In a casting bait, the combination with an elongated body of a resilient member having an annular band portion fitting closely around the rear end portion of the body for frictional attachment thereto, and a plurality of symmetrically disposed resilient wings joined to the member at spaced points circumferentially thereof and extending forwardly therefrom to lie alongside the body in slightly diverging relation thereto, the wings being flexible outwardly to diverge away from the body through varying distances in response to water pressure impinging against the inner faces of the wings resulting from relative motion between the body and the water, thereby to impart an erratic movement of the body.

2. A casting bait according to claim 1 in which said wings are transversely bowed outwardly to establish between themselves and the proximate sides of the body channels into which water may readily enter upon such relative motion.

3. A casting bait according to claim 1 in which said wings are transversely bowed outwardly to establish between themselves and the proximate sides of the body channels into which water may readily enter upon such relative motion between the body and the water, and in which opposite edges of the wings are toothed and tapered inwardly toward their forward ends.

4. In a casting bait, the combination of an elongated body provided exteriorly with a plurality of longitudinally extending channels, a resilient member having an annular band portion fitting closely around the rear end portion of the body for frictional attachment thereto, and a plurality of symmetrically disposed resilient wings joined to the member at spaced points circumferentially thereof, one opposite each body channel, and extending forwardly to lie alongside the body, the wings being flexible outwardly to diverge away from the body through varying distances in response to the pressure of water coursing through the channels and impinging against the inner faces of the wings upon relative motion between the body and the water, thereby to impart an erratic movement to the body.

5. A bait according to claim 4 in which an axial opening is provided through its body, in which the resilient member extends rearwardly beyond the rear end of the body to form a partial closure therebeyond, in which a hook is disposed rearwardly of the body within the partial closure to be confined in place thereby with the barbed end of the hook protruding outwardly of the partial closure, and in which a leader is attached to the hook and extended forwardly therefrom through the axial opening of the body.

6. In a casting bait, the combination of an elongated chambered body, a resilient member having an annular band portion fitting closely around the rear end portion of the body for frictional attachment thereto, a plurality of symmetrically disposed resilient wings joined to the member at spaced points circumferentially thereof and extending forwardly to lie alongside the body in slightly divergent relation thereto, the wings being flexible outwardly to diverge away from the body through varying distances in response to pressure of water impinging against their inner faces upon relative motion between the body and the water, the body wall being formed with a filler opening communicating with the body chamber and through which liquid in a desired amount may be introduced into the chamber, and a weighted plug coacting with the filler opening to provide a closure therefor, the weight of the plug being such as to normally hold the body against rotation during its advance through the water.

7. A bait according to claim 6 in which a tube open at both ends is extended axially through the body and the chamber interiorly thereof, in which the resilient member extends rearwardly beyond the rear end of the body to form a partial closure therebeyond, in which a hook is disposed rearwardly of the body within the partial closure and confined in place thereby with the barbed end of the hook protruding outwardly of the partial closure, and in which a leader is attached to the hook and extends forwardly therefrom through the tube.

8. In a casting bait, the combination of an elongated body through which is an axial opening, a resilient member having an annular band portion fitting closely around the rear end portion of the body for frictional attachment thereto, a plurality of symmetrically disposed resilient wings joined to the member at spaced points circumferentially thereof and extending forwardly to lie alongside the body in slightly divergent relation thereto, the wings being flexible outwardly to diverge away from the body through varying distances in response to pressure of water impinging against their inner faces upon relative motion between the body and the water, the member extending past the rear end of the body to provide a partial closure therebeyond, a hook disposed rearwardly of the body within the partial closure and confined in place thereby with the barbed end of the hook protruding outwardly of the partial closure, and a leader attached to the hook and extending forwardly therefrom through the axial opening.

9. In a casting bait, the combination of an elongated body provided exteriorly with a plurality of longitudinally extending channels, a resilient member having an annular band portion fitting closely around the rear end portion of the body for frictional attachment thereto, the member extending past the rear end of the body to provide a partial closure therebeyond, a plurality of resilient wings joined to the member at spaced points circumferentially thereof, one opposite each body channel, and extending forwardly to lie alongside the body, the wings being flexible outwardly to diverge away from the body through varying distances in response to the pressure of water impinging against the wings upon relative movement of the body and the water, thereby to direct water into said partial closure, and a treble hook disposed rearwardly of the body within the partial closure, with the barbed end of each hook of the treble hook protruding outwardly of the partial closure through an opening therein, and with the point and barb of each said hook being positioned closely adjacent the outer surface of the member.

References Cited in the file of this patent

UNITED STATES PATENTS

| | | |
|---|---|---|
| 2,027,069 | Sorenson | Jan. 7, 1936 |
| 2,183,816 | Lovelace | Dec. 19, 1939 |
| 2,261,068 | Mackovich | Oct. 28, 1941 |
| 2,484,744 | Roman | Oct. 11, 1949 |